United States Patent
Lee

(10) Patent No.: US 10,933,746 B2
(45) Date of Patent: Mar. 2, 2021

(54) VEHICLE DISPLAY DEVICE, VEHICLE DISPLAY CONTROL APPARATUS, AND SYSTEM INCLUDING THE VEHICLE DISPLAY DEVICE AND THE VEHICLE DISPLAY CONTROL APPARATUS

(71) Applicants: HYUNDAI MOTOR COMPANY, Seoul (KR); KIA MOTORS CORPORATION, Seoul (KR)

(72) Inventor: Sung Woo Lee, Gwacheon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/537,195

(22) Filed: Aug. 9, 2019

(65) Prior Publication Data

US 2020/0156471 A1 May 21, 2020

(30) Foreign Application Priority Data

Nov. 20, 2018 (KR) .......................... 10-2018-0143877

(51) Int. Cl.
*G02B 30/00* (2020.01)
*B60K 35/00* (2006.01)
*G02B 27/01* (2006.01)

(52) U.S. Cl.
CPC .............. *B60K 35/00* (2013.01); *G02B 30/00* (2020.01); *G02B 2027/014* (2013.01)

(58) Field of Classification Search
CPC .. G02B 2027/014; G02B 30/00; G02B 30/33; G02B 27/01; G02B 30/27; B60K 35/00; B60K 2370/1526; B60K 2370/1531
See application file for complete search history.

(56) References Cited

U.S. PATENT DOCUMENTS

| | | | | |
|---|---|---|---|---|
| 2009/0102990 A1* | 4/2009 | Walton | ................. | H04N 13/351 349/15 |
| 2009/0201571 A1* | 8/2009 | Gally | .................... | G02B 6/0041 359/315 |
| 2014/0285334 A1* | 9/2014 | Sano | ..................... | B60K 35/00 340/441 |
| 2016/0041656 A1* | 2/2016 | Bita | ..................... | G02B 6/0055 345/175 |
| 2016/0265746 A1* | 9/2016 | Hirasawa | ............... | G02B 6/005 |
| 2018/0141487 A1* | 5/2018 | Osumi | ................. | F21S 43/239 |
| 2018/0284341 A1* | 10/2018 | Woodgate | ............ | G02B 6/0056 |

(Continued)

FOREIGN PATENT DOCUMENTS

KR    10-2015-0038828 A      4/2015

*Primary Examiner* — Zhihan Zhou
(74) *Attorney, Agent, or Firm* — Brinks Gilson & Lione

(57) ABSTRACT

A vehicle display device, a vehicle display control apparatus for controlling the same, and a vehicle display system including the vehicle display device and the vehicle display control apparatus are provided. The vehicle display system includes a single vehicle display device and a vehicle display control apparatus that controls application of voltage for driving the single vehicle display device and controls the single vehicle display device to switch to and operate in one of a first mode for displaying a single view, a second mode for displaying a multi-view, a third mode for displaying a three-dimensional view, and a fourth mode for displaying a two-dimensional view.

18 Claims, 20 Drawing Sheets

(56) References Cited

U.S. PATENT DOCUMENTS

| | | | |
|---|---|---|---|
| 2018/0370418 A1* | 12/2018 | Shinohara | G02B 27/0101 |
| 2019/0077416 A1* | 3/2019 | Ueno | G02B 6/0036 |
| 2019/0189705 A1* | 6/2019 | Yang | G09G 3/3225 |

* cited by examiner

VEHICLE DISPLAY DEVICE, VEHICLE DISPLAY CONTROL APPARATUS, AND SYSTEM INCLUDING THE VEHICLE DISPLAY DEVICE AND THE VEHICLE DISPLAY CONTROL APPARATUS

CROSS-REFERENCE TO RELATED APPLICATION

The present application claims priority to and the benefit of priority to Korean Patent Application No. 10-2018-0143877, filed on Nov. 20, 2018, which is incorporated herein by reference in its entirety.

FIELD

The present disclosure relates to a vehicle display device, a vehicle display control apparatus for controlling the same, and a system including the vehicle display device and the vehicle display control apparatus.

BACKGROUND

The statements in this section merely provide background information related to the present disclosure and may not constitute prior art.

Recently, display devices have been used in various applications. Furthermore, due to slimness and lightness, display devices have been widely used. In particular, display devices in a form similar to a flat panel have been widely studied and manufactured, and the scope of application and connectivity have been increased.

Vehicles that transport people or cargo are provided with various conveniences through technical development for a long time. One or more pieces of information need to be displayed to a user, for example, a driver or a passenger in a vehicle.

However, there is a limitation in improving user convenience and driving stability through the display of information in the vehicle. In particular, to output different image data to the driver and the passenger, a plurality of vehicle display devices are required, which leads to an increase in cost.

SUMMARY

An aspect of the present disclosure provides a single vehicle display device for switching between a single view, a multi-view, a two-dimensional view, and a three-dimensional view, a vehicle display control apparatus for controlling the vehicle display device, and a system including the vehicle display device and the vehicle display control apparatus.

Another aspect of the present disclosure provides a vehicle display device for providing a single view, a multi-view, a two-dimensional view, and a three-dimensional view according to necessity by projecting data synchronized with a light source in a time-division manner, a vehicle display control apparatus for controlling the vehicle display device, and a system including the vehicle display device and the vehicle display control apparatus.

In some forms of the present disclosure, a vehicle display system includes a single vehicle display device and a vehicle display control apparatus that controls application of voltage for driving the single vehicle display device and controls the single vehicle display device to switch to and operate in one of a first mode for displaying a single view, a second mode for displaying a multi-view, a third mode for displaying a three-dimensional view, and a fourth mode for displaying a two-dimensional view.

In some forms of the present disclosure, the single vehicle display device may include a light guide panel having a reflective surface through which output light is output, a shape of the reflective surface being varied depending on a level of the applied voltage to vary an optical path and electric power applied to a transparent electrode of the light guide panel.

In some forms of the present disclosure, the vehicle display control apparatus may store drive voltage levels for the first to fourth modes in advance by experimental values.

In some forms of the present disclosure, in the first mode, the vehicle display control apparatus may control application of voltage of the same level that is set to cause a first light source and a second light source to be output in the same direction. In the second mode, the vehicle display control apparatus may linearly vary and apply voltage that is set to cause the first light source and the second light source to be output in different directions. In the third mode, the vehicle display control apparatus may exponentially vary and apply voltage that is set to cause the first light source and the second light source to be output.

In some forms of the present disclosure, the light guide panel may include a lower substrate, a first insulation layer stacked on the lower substrate, a pattern of first electrodes spaced at predetermined intervals from each other on the first insulation layer, a second insulation layer that insulates the first electrodes from each other, a pattern of second electrodes spaced at predetermined intervals from each other on the second insulation layer, a polymer layer formed on the second electrodes, the polymer layer being capable of a phase shift, and an upper substrate stacked on the polymer layer capable of the phase shift.

In some forms of the present disclosure, when voltages are applied to the first electrodes and the second electrodes, phase alignments of polymers in the polymer layer capable of the phase shift may be varied and the shape of the reflective surface may be varied by the phase alignments of the polymers.

In some forms of the present disclosure, in the first mode, the vehicle display control apparatus may perform time-division on the same image data and may output the same image data together with the first light source and the second light source.

In some forms of the present disclosure, in the second or third mode, the vehicle display control apparatus may perform time-division on different image data and may output first image data when the first light source is output and second image data when the second light source is output.

In some forms of the present disclosure, in the second mode, the vehicle display control apparatus may output the first image data to a first user and the second image data to a second user through the single vehicle display device.

In some forms of the present disclosure, in the third mode, the vehicle display control apparatus may output the first image data and the second image data as three-dimensional image data to a first user through the single vehicle display device.

In some forms of the present disclosure, the vehicle display control apparatus may synchronize a clock for output light of a switching light guide of the vehicle display device and a clock of image data when one of the first to fourth modes is selected.

In some forms of the present disclosure, the vehicle display control apparatus may perform time-division on a data frame through a time-division multiplexing data frame (TDMD) and may output multi-image data to the single vehicle display device.

In some forms of the present disclosure, the single vehicle display device may include a multi-optical path switching light guide (MO-SLG).

In another aspect of the present disclosure, a vehicle display device includes a light guide panel having a reflective surface through which output light is output, a shape of the reflective surface being varied depending on a level of applied voltage to vary an optical path and electric power applied to a transparent electrode of the light guide panel.

In some forms of the present disclosure, the light guide pane may include a lower substrate, a first insulation layer stacked on the lower substrate, a pattern of first electrodes spaced at predetermined intervals from each other on the first insulation layer, a second insulation layer that insulates the first electrodes from each other, a pattern of second electrodes spaced at predetermined intervals from each other on the second insulation layer, a polymer layer formed on the second electrodes, the polymer layer being capable of a phase shift, and an upper substrate stacked on the polymer layer capable of the phase shift.

In some forms of the present disclosure, when voltages are applied to the first electrodes and the second electrodes, phase alignments of polymers in the polymer layer capable of the phase shift may be varied and the shape of the reflective surface may be varied by the phase alignments of the polymers.

In another aspect of the present disclosure, a vehicle display control apparatus includes a processor that controls application of voltage for driving a single vehicle display device and controls the single vehicle display device to switch to and operate in one of a first mode for displaying a single view, a second mode for displaying a multi-view, a third mode for displaying a three-dimensional view, and a fourth mode for displaying a two-dimensional view and storage that stores a voltage set for driving the single vehicle display device.

In some forms of the present disclosure, in the first mode, the processor may control application of voltage of the same level that is set to cause a first light source and a second light source to be output in the same direction. In the second mode, the processor may linearly vary and apply voltage that is set to cause the first light source and the second light source to be output in different directions. In the third mode, the processor may exponentially vary and apply voltage that is set to cause the first light source and the second light source to be output.

In some forms of the present disclosure, in the first mode, the processor may perform time-division on the same image data and may output the same image data together with the first light source and the second light source. In the second or third mode, the processor may perform time-division on different image data and may output first image data when the first light source is output and second image data when the second light source is output.

In some forms of the present disclosure, in the second mode, the processor may output the first image data to a first user and the second image data to a second user through the single vehicle display device. In the third mode, the processor may output the first image data and the second image data as three-dimensional image data to the first user through the single vehicle display device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
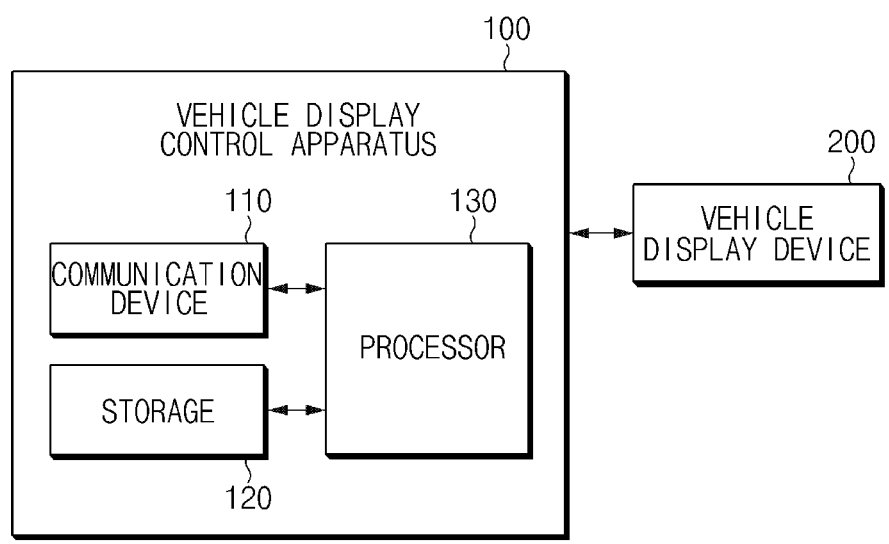
FIG. 1 is a block diagram illustrating a configuration of a vehicle display system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses a configuration capable of freely switching between a multi-view screen, a single view screen, a two-dimensional (2D) view screen, and a three-dimensional (3D) view screen for providing separate contents for users (a driver and a passenger) at the same time on a screen of a single vehicle display device.

Hereinafter, some forms of the present disclosure will be described in detail with reference to FIGS. 1 to 20.

Figure 2:
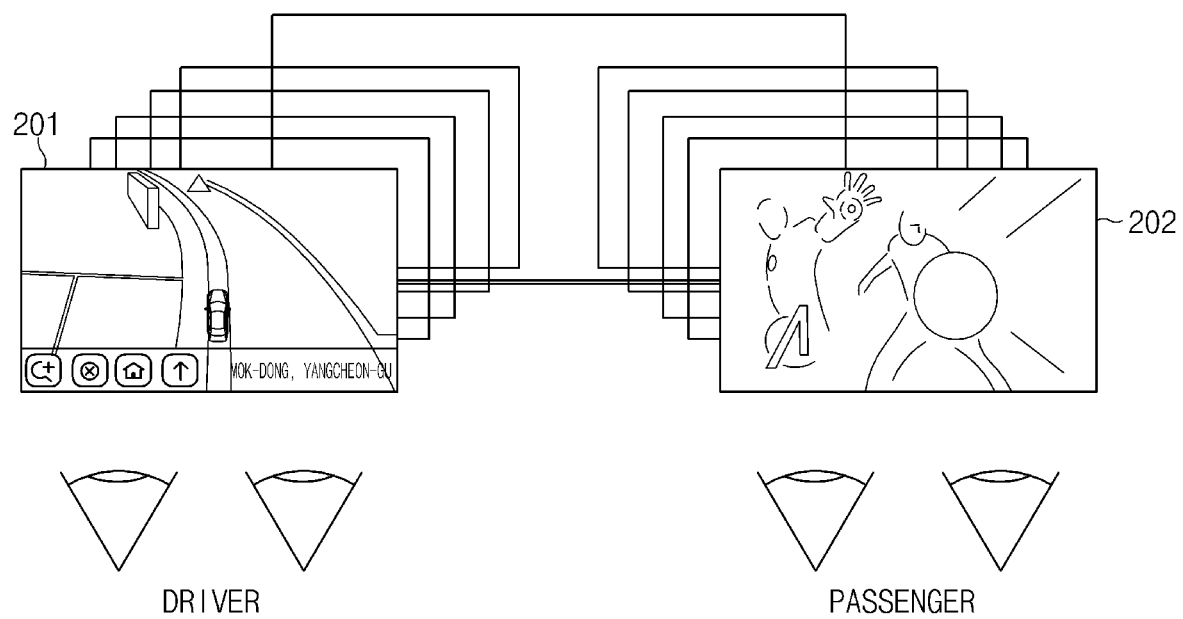
FIG. 2 is a view illustrating an example of dually displaying a single display screen in the vehicle display system in one form of the present disclosure.
Figure 3:
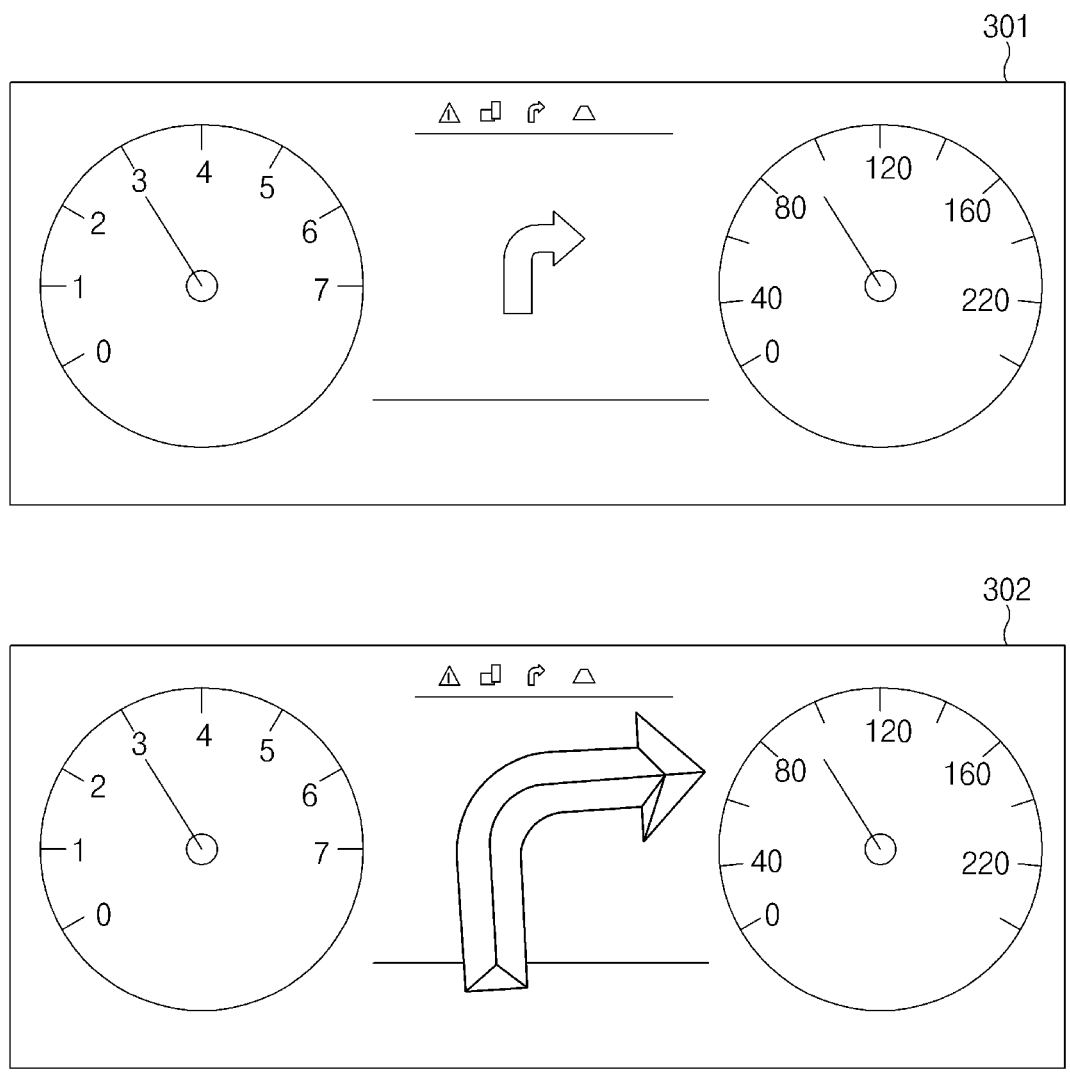
FIG. 3 is a view illustrating a 2D screen and a 3D screen in the vehicle display system in one form of the present disclosure.

FIG. 1 is a block diagram illustrating a configuration of a vehicle display system including a vehicle display control apparatus in some forms of the present disclosure. FIG. 2 is a view illustrating an example of dually displaying a single display screen in the vehicle display system in some forms of the present disclosure. FIG. 3 is a view illustrating a 2D screen and a 3D screen in the vehicle display system in some forms of the present disclosure.

Referring to FIG. 1, the vehicle display system in some forms of the present disclosure may include a vehicle display control apparatus 100 and a vehicle display device 200.

The vehicle display control apparatus 100 may control application of voltage for driving the single vehicle display device 200 and may control the single vehicle display device 200 to switch to and operate in one of a first mode for displaying a single view, a second mode for displaying a multi-view, a third mode for displaying a 3D view, and a fourth mode for displaying a 2D view. Furthermore, the vehicle display control apparatus 100 performs time-division on different image data or the same image data to be provided to a driver and a passenger and provides the different image data or the same image data to the single vehicle display device 200. The vehicle display control apparatus 100 performs the time-division through a time-division multiplexing data frame (TDMD).

The vehicle display control apparatus 100 may include a communication device 110, storage 120, and a processor 130.

The communication device 110 is a hardware device that is implemented with various electronic circuits to transmit and receive signals via wireless or wired connection. In this disclosure, the communication device 110 may perform in-vehicle communication via CAN communication or LIN communication and may perform communication with the vehicle display device 200.

The storage 120 may store voltage set information for voltage control of a multi-optical path switching light guide using a light guide panel (LGP) and contents information to be provided to a user. In this case, the voltage set information may be determined by experimental values and stored in advance. The storage 120 may include at least one type of storage medium among memories of a flash memory type, a hard disk type, a micro type, and a card type (e.g., a secure digital (SD) card or an eXtream digital (XD) card) and memories of a random access memory (RAM) type, a static RAM (SRAM) type, a read-only memory (ROM) type, a programmable ROM (PROM) type, an electrically erasable PROM (EEPROM) type, a magnetic RAM (MRAM) type, a magnetic disk type, and an optical disk type.

The processor 130 may be electrically connected to the communication device 110 and the storage 120 and may electrically control the components. The processor 130 may be electric circuitry that execute commands of software and may perform various data processing or computation, which will be described below.

The processor 130 may control application of voltage for driving the single vehicle display device 200 and may control the single vehicle display device 200 to switch to and operate in one of a first mode (a single view display mode) for displaying a single view, a second mode (a multi-view display mode) for displaying a multi-view, a third mode (a 3D view display mode) for displaying a 3D view, and a fourth mode (a 2D view display mode) for displaying a 2D view.

When the first mode is selected, the processor 130 applies voltage to the vehicle display device 200 according to the voltage set information, which is stored in the storage 120, to cause a first light source ODD and a second light source EVEN to be output in the same direction. In this case, the first mode may be a state in which no voltage is applied.

In the second mode, the processor 130 may linearly vary and apply voltage that is set to cause the first light source and the second light source to be output in different directions, to the vehicle display device 200. In the third mode, the processor 130 may exponentially vary and apply voltage that is set to cause the first light source and the second light source to be output, to the vehicle display device 200.

In the first mode, the processor 130 may perform time-division on the same image data for a single view and may output the same image data together with the first light source and the second light source. In the second or third mode, the processor 130 may perform time-division on different image data for a multi-view or a stereoscopic screen and may output first image data when the first light source is output and second image data when the second light source is output. In the second mode, the processor 130 may output the first image data to a first user and the second image data to a second user through the single vehicle display device 200.

In the third mode, the processor 130 may output the first image data and the second image data as 3D image data to the first user through the single vehicle display device 200.

When one of the first to fourth modes is selected, the processor 130 may synchronize a clock for light source output of a switching light guide of the vehicle display device 200 and a clock of image data.

The vehicle display device 200 may display vehicle driving related information, navigation route information, multimedia contents, and images of surroundings of the vehicle through the multi-optical path switching light guide (MO-SLG). The vehicle display device 200 is a single terminal, but may display dual contents according to a user's viewing angle. The vehicle display device 200 may be mounted on a center fascia between the driver's seat and the front passenger seat. The driver may view a screen of the vehicle display device 200 in a rightward direction, and a passenger on the front passenger seat may view the screen of the vehicle display device 200 in a leftward direction. In a case where the driver and the passenger simultaneously view the single vehicle display device 200, a navigation route screen 210 is shown to the driver and multimedia contents 202, such as a movie, are shown to the passenger as illustrated in FIG. 2. Furthermore, the vehicle display device 200 may display a 2D screen as indicated by reference numeral 301 of FIG. 3, or may display a 3D screen as indicated by reference numeral 302 of FIG. 3.

The vehicle display device 200 may be implemented with a head-up display (HUD), a cluster, or an audio video navigation (AVN). The vehicle display device 200 may include at least one of a liquid crystal display (LCD), a thin film transistor-LCD (TFT LCD), a light emitting diode (LED) display, an organic LED (OLED) display, an active matrix OLED (AMOLED) display, a flexible display, a bended display, and a 3D display. Some of the displays may be implemented as a transparent display of a transparent or photo-transparent type such that the outside can be viewed therethrough. Furthermore, the vehicle display device 200 may be implemented with a touch screen including a touch panel and may be used as an input device as well as an output device.

Figure 4:
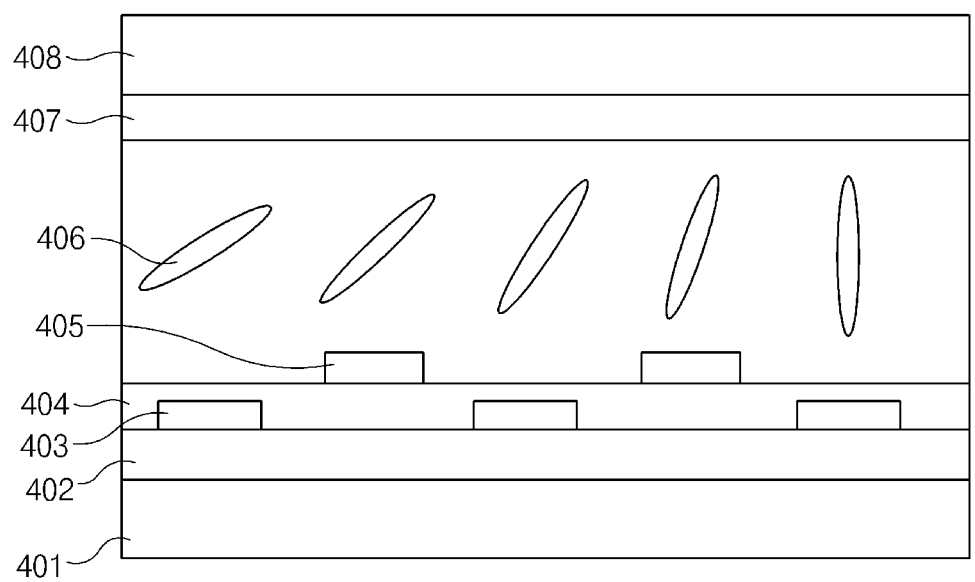
FIG. 4 is a sectional view illustrating a structure of a multi-optical path light guide panel in one form of the present disclosure.

The vehicle display device 200 in this disclosure may include a multi-optical path switching light guide using a light guide panel (LGP) illustrated in FIG. 4.

Figure 5:
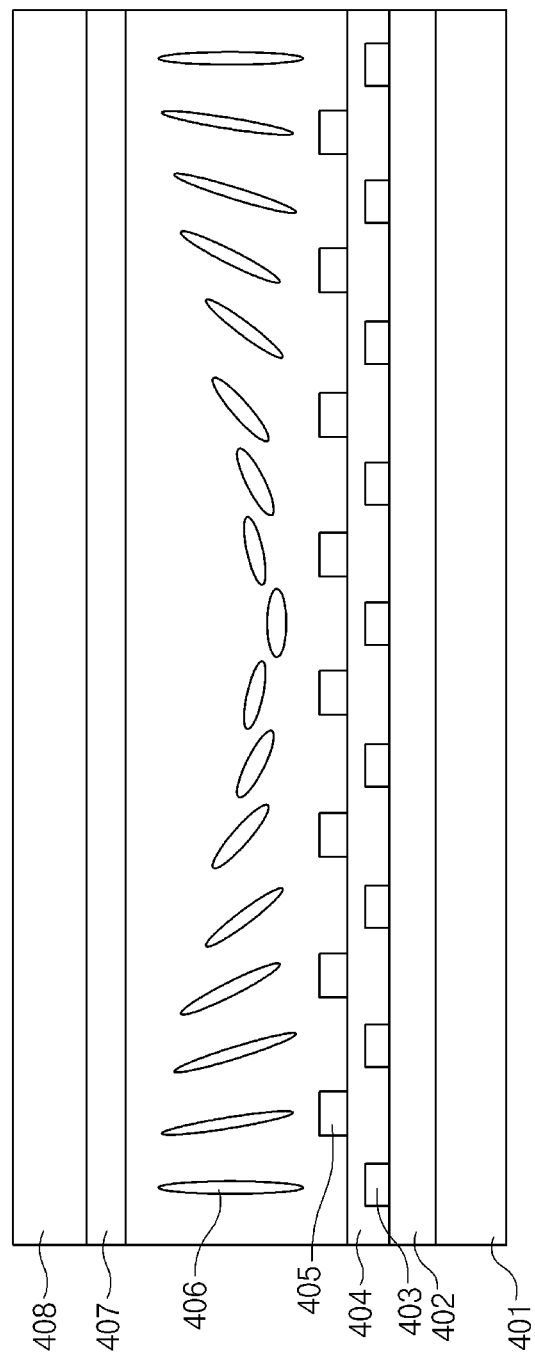
FIG. 5 is a view illustrating phase alignments of polymers depending on voltage applied to a multi-optical path switching light guide in one form of the present disclosure.
Figure 6:
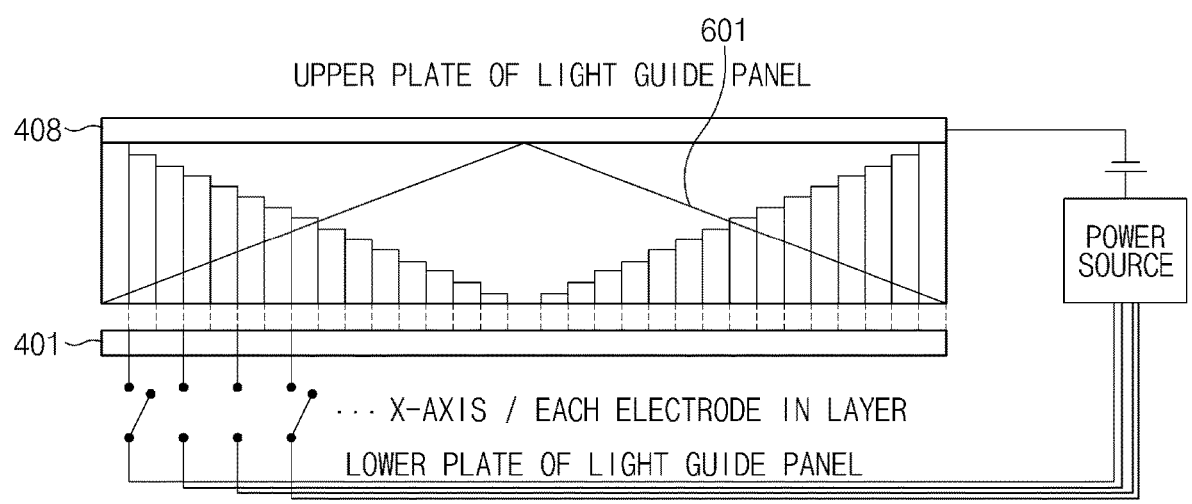
FIG. 6 is a view illustrating a reflective surface depending on voltage applied to the multi-optical path switching light guide in one form of the present disclosure.

FIG. 4 is a sectional view illustrating a structure of a multi-optical path light guide panel in some forms of the present disclosure. FIG. 5 is a view illustrating phase alignments of polymers depending on voltage applied to a multi-optical path switching light guide in some forms of the present disclosure. FIG. 6 is a view illustrating a reflective surface depending on voltage applied to the multi-optical path switching light guide in some forms of the present disclosure.

The multi-optical path light guide panel (LGP) refers to a light guide that contains polymers capable of an optical-path phase shift. The multi-optical path light guide panel may have a point matrix or a linear groove on the bottom thereof to vary an optical path.

Referring to FIG. 4, the multi-optical path light guide panel includes a lower glass substrate 401, a first insulation layer 402 stacked on the lower glass substrate 401, a pattern of first electrodes 403 spaced at predetermined intervals from each other on the first insulation layer 402, a second insulation layer 404 insulating the first electrodes 403 from each other, a pattern of second electrodes 405 spaced at predetermined intervals from each other on the second insulation layer 404, a polymer layer 406 capable of a phase shift that is stacked on the second electrodes 405, a third electrode 407 (Vcom) stacked on the polymer layer 406 capable of a phase shift, and an upper glass substrate 408 stacked on the third electrode 407. In this case, the first electrodes, the second electrodes, and the third electrode may be formed of a transparent electrode.

Referring to FIG. 5, the phases of polymers LC in the polymer layer 406 capable of a phase shift are controlled depending on voltage, and therefore the alignments of the polymers LC are controlled to vary an optical path. In FIG. 5, polymers LC in the center of the polymer layer 406 are in a horizontal position, and polymers LC on opposite sides of the polymer layer 406 are in a vertical position. Accordingly, light transmits through the center of the polymer layer 406, but fails to transmit through the opposite sides thereof.

Referring to FIG. 6, when voltage is applied from a power source to the multi-optical path light guide panel, the shape of a reflective surface 601 is determined depending on the phase alignments of the polymers LC in the polymer layer 406 capable of a phase shift.

As described above, when the multi-optical path switching light guide outputs the output light source, the shape of the reflective surface, that is, the scan angle is varied depending on an applied-voltage level change to form a variable optical path.

At this time, the phases of the polymers are controlled depending on voltage levels applied to the electrodes 403 and 405, and an optical-path shift depending on the phases occurs. In this case, the magnitudes of the voltage levels may vary depending on properties of the polymers. Polymer properties $\varepsilon\|$ and $\varepsilon^\perp$ and anisotropies ne and no are unique constants of the polymer properties, and the voltage levels applied to the transparent electrodes may be obtained as experimental values with respect to the polymer properties.

Furthermore, the phases of the polymers may be precisely controlled by minimizing the pitches of the first electrodes 403 and the second electrodes 405 by the first insulation layer 402 and the second insulation layer 404.

In addition, isotropic or anisotropic phase control may be performed on the switching light guide of the LGP, and therefore switching between a multi-view display mode, a single view display mode, and a 3D view display mode may be possible.

Hereinafter, an operation in a single view display mode will be described in detail with reference to FIGS. 7 to 9.

Figure 7:
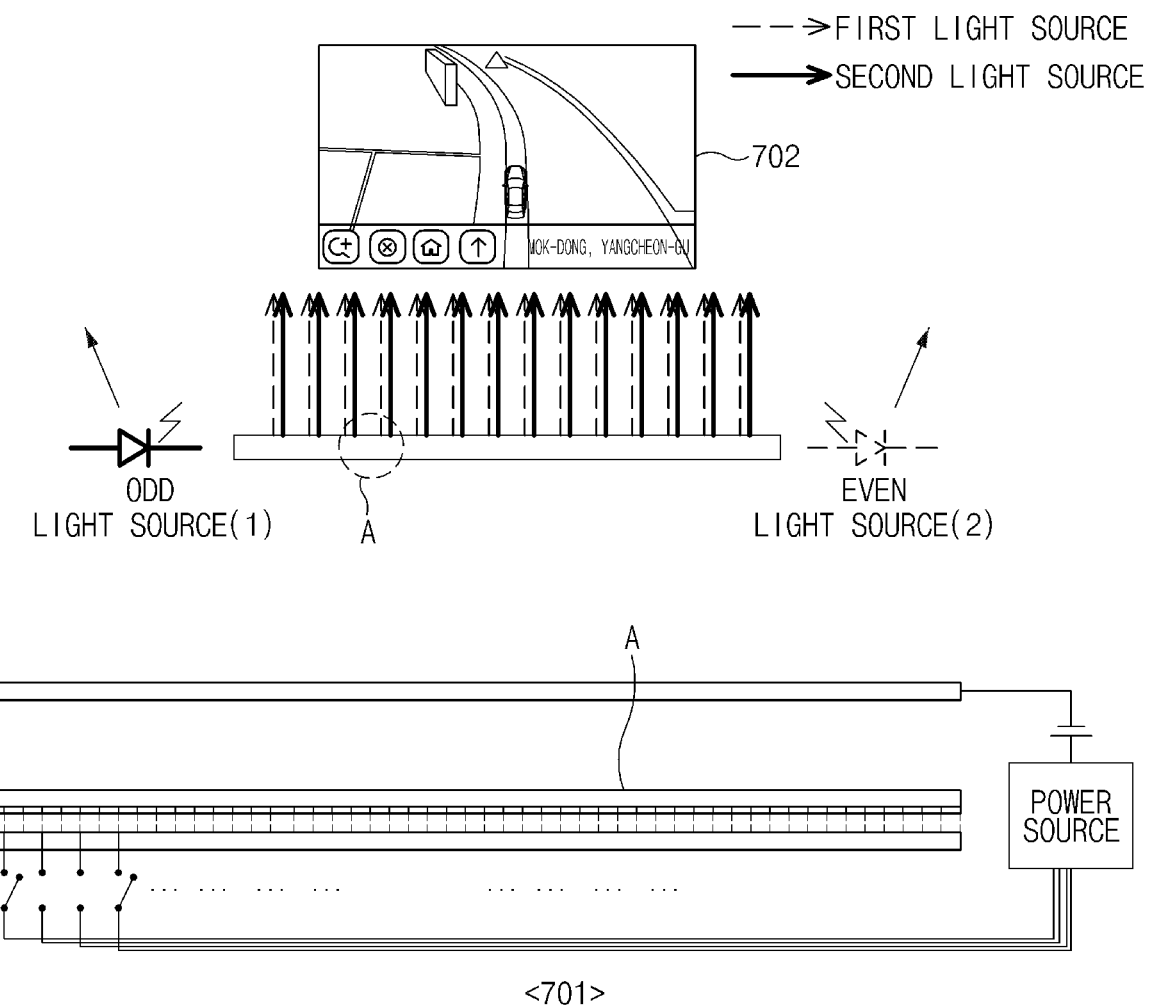
FIG. 7 is a view illustrating an exemplary operation of a switching light guide in a single view display mode in one form of the present disclosure.

FIG. 7 is a view illustrating an exemplary operation of a switching light guide in a single view display mode in some forms of the present disclosure. FIG. 8 is a timing chart illustrating reference clock synchronization of output data in the single view display mode in some forms of the present disclosure. FIG. 9 is a view illustrating a single view display screen in some an forms of the present disclosure.

Referring to FIG. 7, light sources are provided, and voltage off or low voltage may be applied to transparent electrodes of a light guide panel 701 to cause the light guide panel 701 to operate in a single view display mode. At this time, a reflective surface A has a flat form. Accordingly, it can be seen that both the first light source ODD and the second light source EVEN are output in the same direction, and therefore the same navigation guide route screen 702 is shown to both a driver and a passenger.

Figure 8:
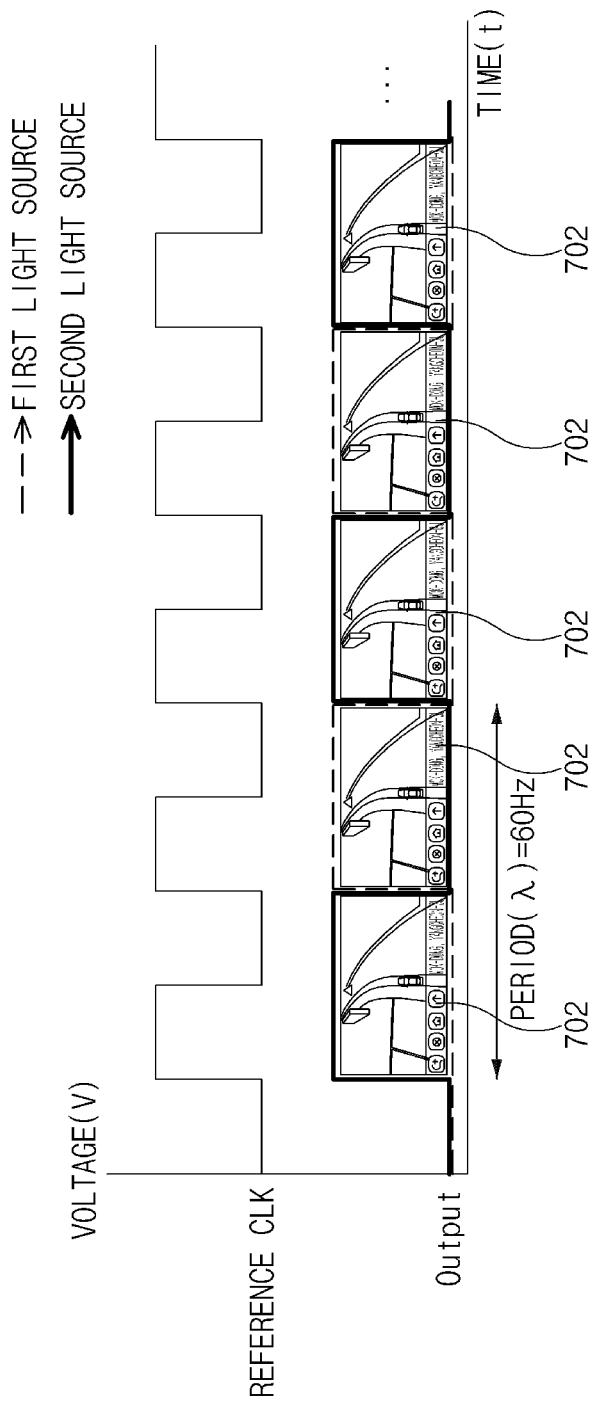
FIG. 8 is a timing chart illustrating reference clock synchronization of output data in the single view display mode in one form of the present disclosure.

Referring to FIG. 8, the vehicle display control apparatus 100 performs time-division on data according to a reference clock (reference clk) and outputs the data. The vehicle display control apparatus 100 performs time-division on the same image data 702 (e.g., a navigation guide route screen) and outputs the same image data.

Figure 9:
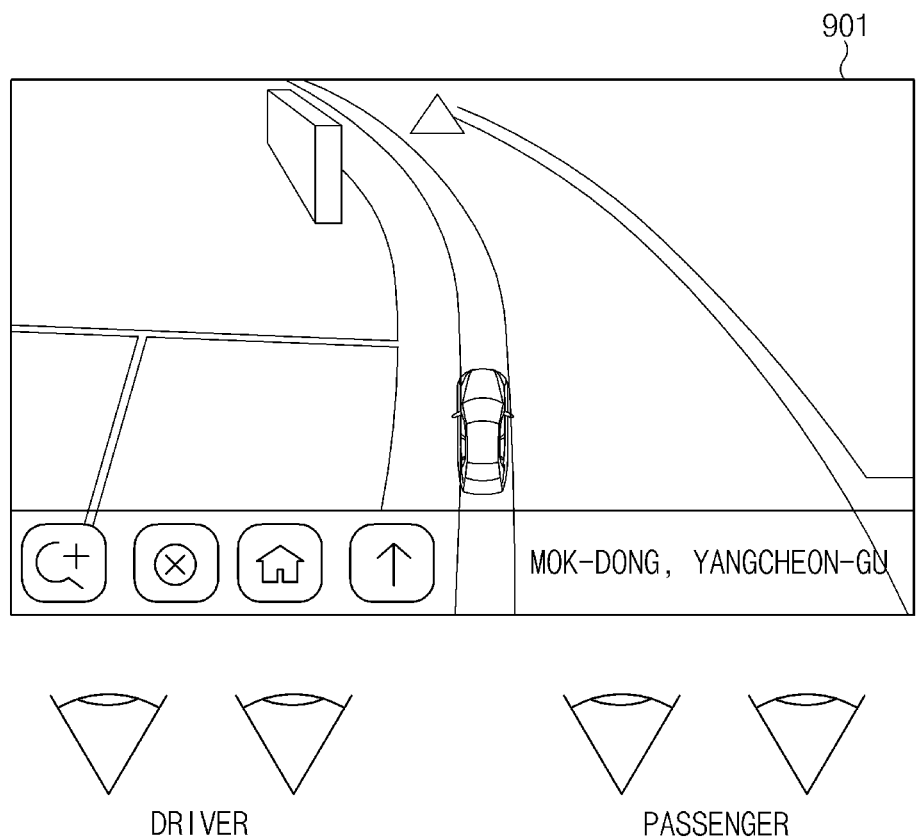
FIG. 9 is a view illustrating a single view display screen in one form of the present disclosure.

Accordingly, it can be seen that the driver and the passenger view the same image 901 on a screen of a single display device as illustrated in FIG. 9. That is, it can be seen that the vehicle display device 200 operates in a single view display mode.

Hereinafter, an operation in a multi-view display mode will be described in detail with reference to FIGS. 10 to 15.

Figure 10:
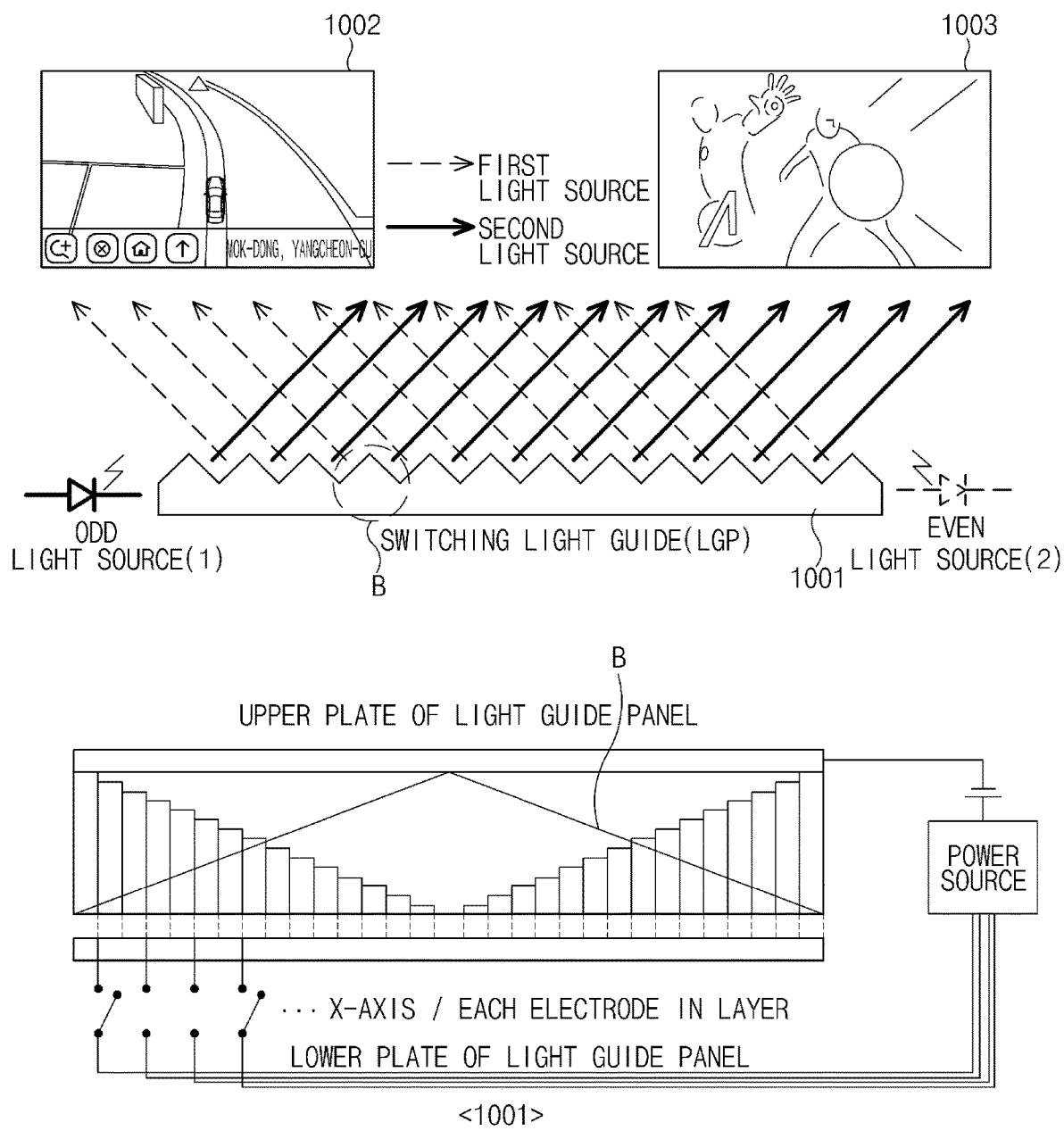
FIG. 10 is a view illustrating an exemplary operation of a switching light guide in a multi-view display mode in one form of the present disclosure.
Figure 11:
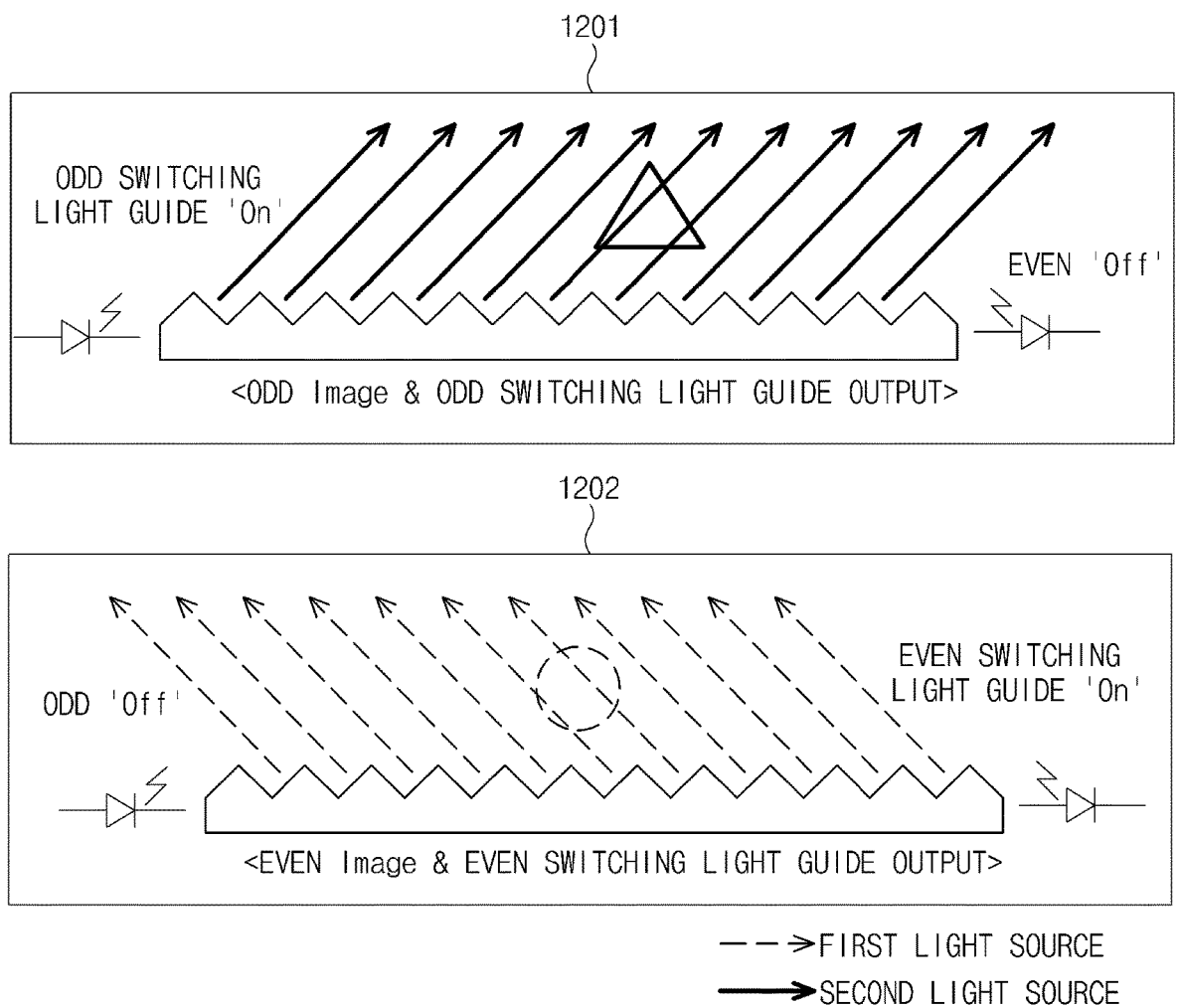
FIG. 11 shows views illustrating output light of an odd light source switching light guide and output light of an even light source switching light guide, respectively, in the multi-view display mode in one form of the present disclosure.
Figure 12:
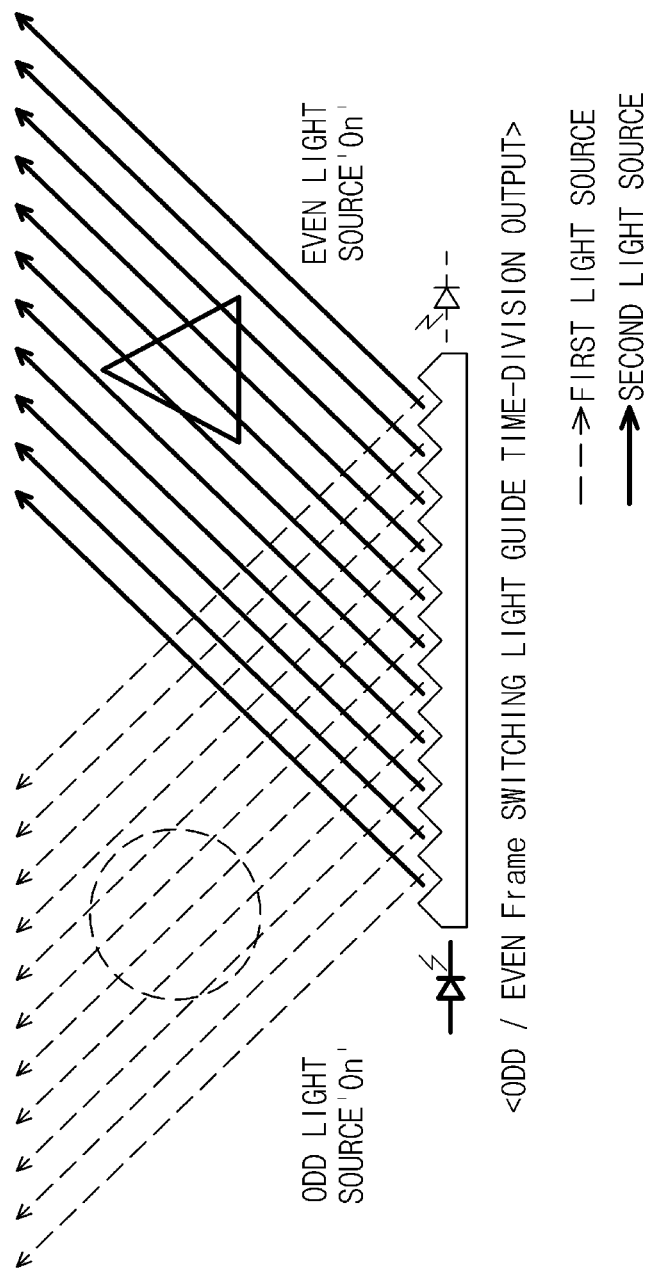
FIG. 12 is a view illustrating the output light of the odd light source switching light guide and the output light of even light source switching light guide together in the multi-view display mode in one form of the present disclosure.

FIG. 10 is a view illustrating an exemplary operation of a switching light guide in a multi-view display mode in some forms of the present disclosure. FIG. 11 shows views illustrating output light of an odd light source switching light guide and output light of an even light source switching light guide, respectively, in the multi-view display mode in some forms of the present disclosure. FIG. 12 is a view illustrating the output light of the odd light source switching light guide and the output light of even light source switching light guide together in the multi-view display mode in some forms of the present disclosure.

Referring to FIG. 10, a reflective surface B of a light guide panel 1001 is formed in a sharp triangular shape. In this case, the vehicle display control apparatus 100 may linearly vary and apply voltage to the light guide panel 1001, and therefore the reflective surface B may be formed in a sharp right-angled shape.

A first light source ODD is output to one side of the reflective surface B, and a second light source EVEN is output to an opposite side of the reflective surface B. A navigation route 1002 is output through the first light source ODD, and multimedia contents 1003 are output through the second light source EVEN.

Accordingly, on the driver's seat side, the navigation route 1002 is displayed on a screen of the vehicle display device 200, and on the front passenger seat side, the multimedia contents 1003 are displayed on a screen of the vehicle display device 200.

In this disclosure, it is exemplified that the reflective surface B is formed in a triangular shape to output a dual image to the driver and the passenger. However, in the case of outputting a triple image, voltage may be controlled such that a reflective surface is formed in the shape of a protrusion (凸) of a bumpy structure.

FIG. 11 illustrates an example 1201 of outputting the first light source ODD in a first direction with respect to the single vehicle display device 200 and an example 1202 of outputting the second light source EVEN in a second direction with respect to the single vehicle display device 200. In this case, first image data Δ may be output together with the first light source ODD, and second image data ○ may be output together with the second light source EVEN.

FIG. 12 illustrates an example that the example 1201 of outputting the first light source ODD and the example 1202 of outputting the second light source EVEN are represented together on the light guide panel.

Figure 13:
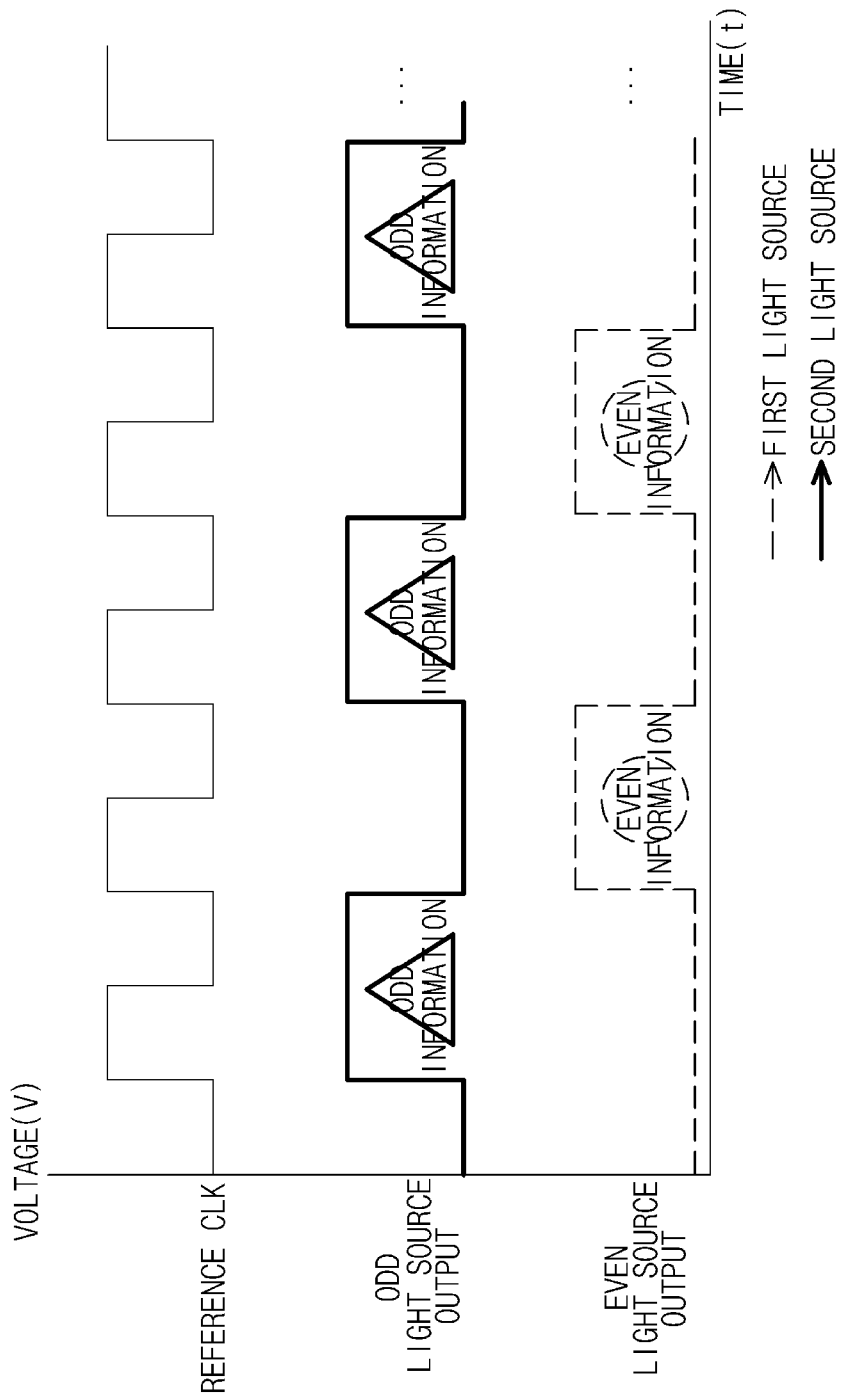
FIG. 13 is a timing chart illustrating reference clock synchronization of output data in a multi-view display mode in one form of the present disclosure.
Figure 14:
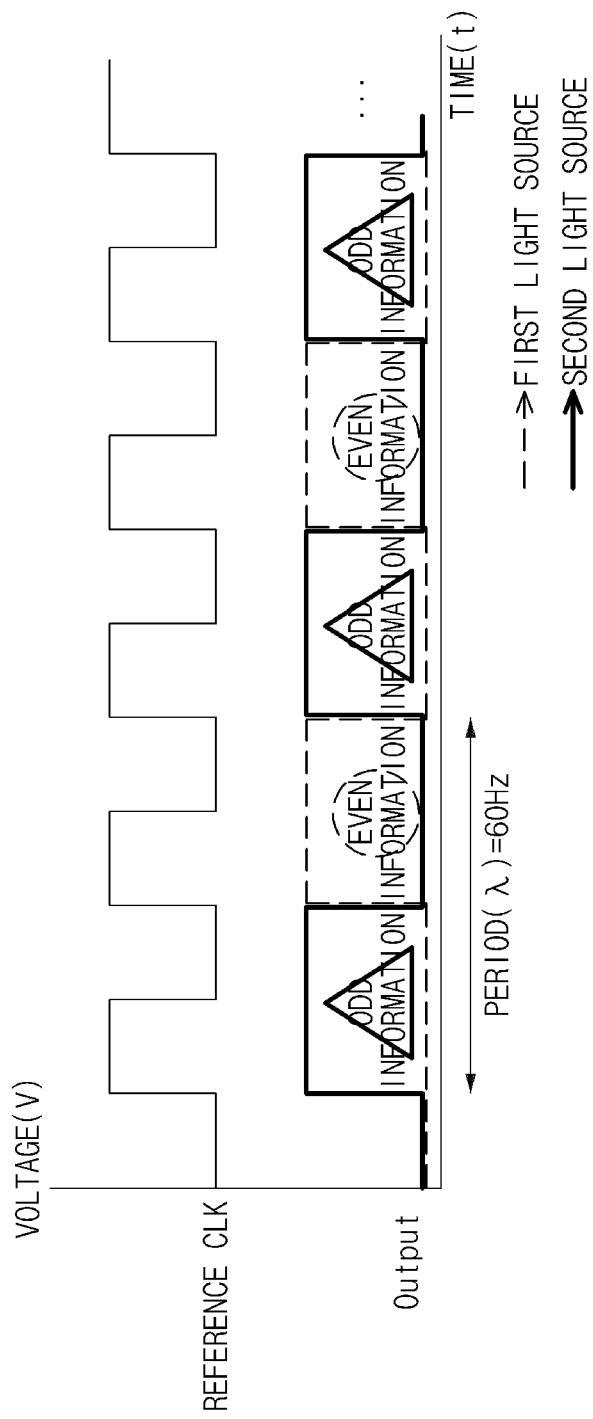
FIG. 14 is a timing chart illustrating a case of outputting different image data in a time-division manner in the multi-view display mode in one form of the present disclosure.
Figure 15:
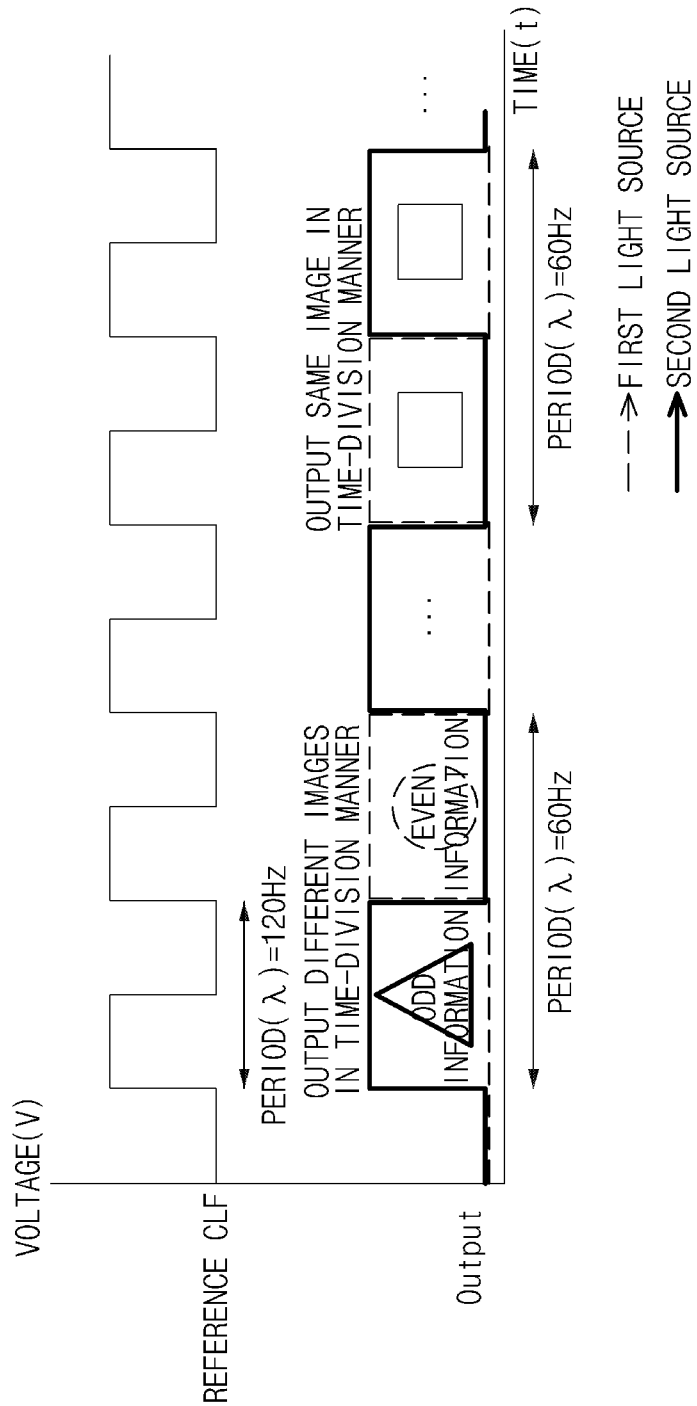
FIG. 15 is a timing chart illustrating a case of outputting different image data in a time-division manner and a case of outputting the same image data in a time-division manner in the multi-view display mode in one form of the present disclosure.

FIG. 13 is a timing chart illustrating reference clock synchronization of output data in a multi-view display mode in some forms of the present disclosure. FIG. 14 is a timing chart illustrating a case of outputting different image data in a time-division manner in the multi-view display mode in some forms of the present disclosure. FIG. 15 is a timing chart illustrating a case of outputting different image data in a time-division manner and a case of outputting the same image data in a time-division manner in the multi-view display mode in some forms of the present disclosure.

In FIG. 13, first image data Δ is output together with a first light source ODD with respect to a reference clock before second image data ○ is output together with a second light source EVEN. That is, the first image data Δ and the second image data ○ are alternately output.

In other words, the vehicle display control apparatus 100 outputs a multi-optical path switching light guide drive frequency in time sequence and outputs n pieces of multiple information by distinguishing between them by a multi-frame synchronized with a transmission clock, and each data frame may be output as separate information.

FIG. 14 illustrates an example that the first image data Δ and the second image data ○ that are output according to the reference clock are displayed together. When 60 Hz is defined as 1 period, 60 Hz is divided into two, and the first image data Δ and the second image data ○ are alternately output in units of 120 Hz. FIG. 15 illustrates an example of outputting different image data in a time-division manner and an example of outputting the same image data in a time-division manner. That is, the image data Δ and ○ different from each other are output to a driver and a passenger in a frame-to-frame manner.

By dually outputting the output light and the image data on the single vehicle display device 200 in a time-division manner at the same time as described above, dual or triple image data may be viewed according to a user's viewing angle with respect to the single vehicle display device 200. Accordingly, if there are many users, three or more images may be displayed by increasing time-division.

A time-division multiplexing data frame (TDMD) is a technology for outputting multiple images by dividing a data frame in synchronization with a switching light guide. FIG. 15 illustrates an example of outputting multiple images at 120 Hz by de-multiplying a data frame synchronized with a light source to ½ at 60 Hz.

That is, the vehicle display control apparatus 100 is operated at 120 Hz (=image 1 (1/120)→image 2 (1/120) →image 1-1 (1/120)→image 2-1 (1/120)) or at a high frequency.

Furthermore, the vehicle display control apparatus 100 independently outputs an output different from or the same as a signal of output data within one period of an EVEN/ODD frame in time sequence. Accordingly, variable dualization and output of n or more pieces of data are possible by output of n data signals and synchronization of a light source.

By allowing multi-information to be displayed on the single vehicle display device 200, the driver and the passenger may view contents desired by them. In addition, multiple images may be output without addition of a separate light output source, which makes possible continual support and selective on/off of driving information for the driver and the passenger.

Figure 17:
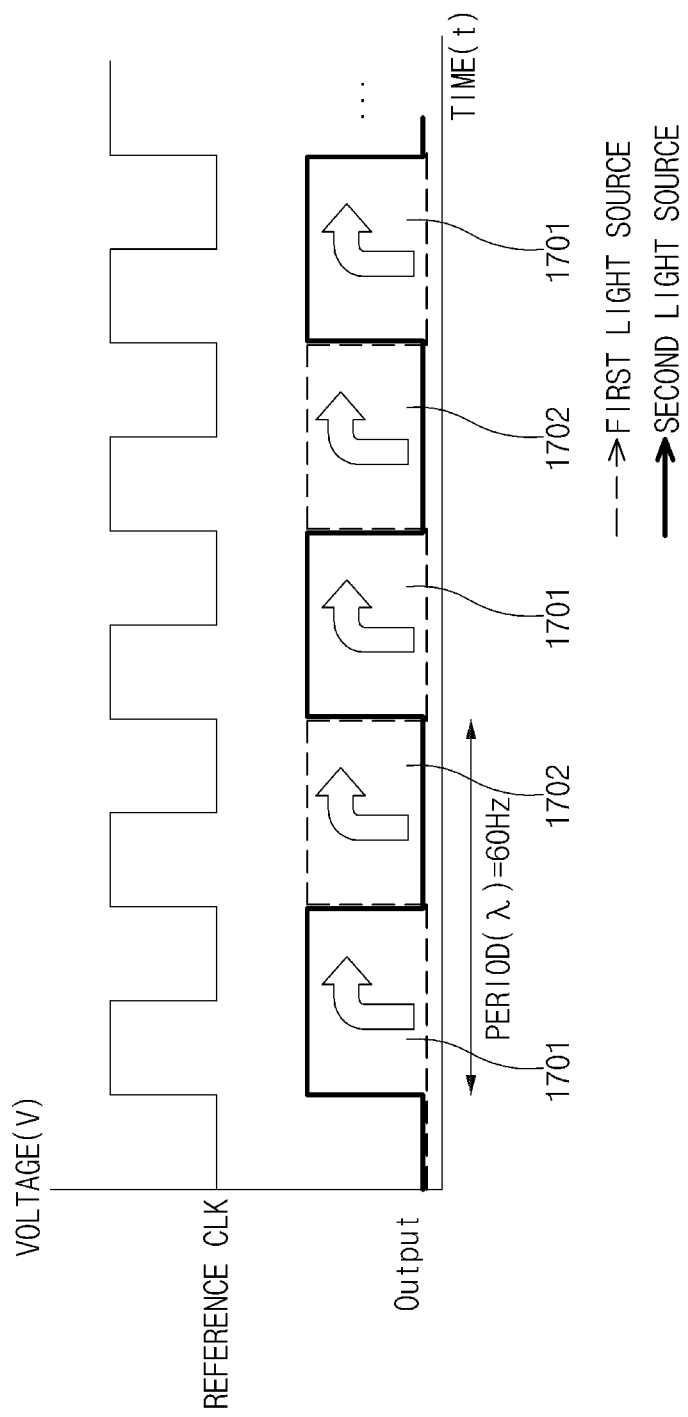
FIG. 17 is a timing chart illustrating a case of outputting different image data in a time-division manner in the 3D view display mode in one form of the present disclosure.
Figure 18:
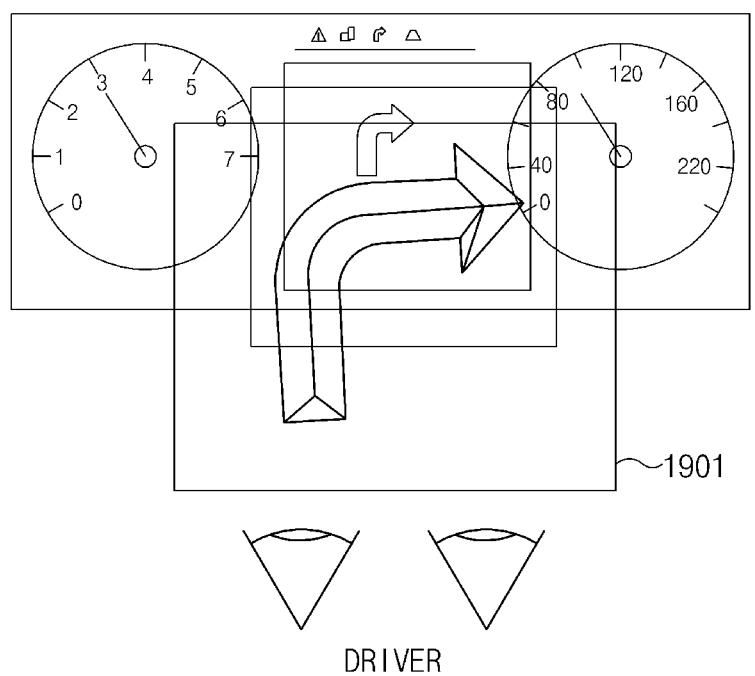
FIG. 18 is a view illustrating a 3D screen in the 3D view display mode in one form of the present disclosure.

Hereinafter, an operation in a 3D view display mode will be described in detail with reference to FIGS. 16 to 18.

Figure 16:
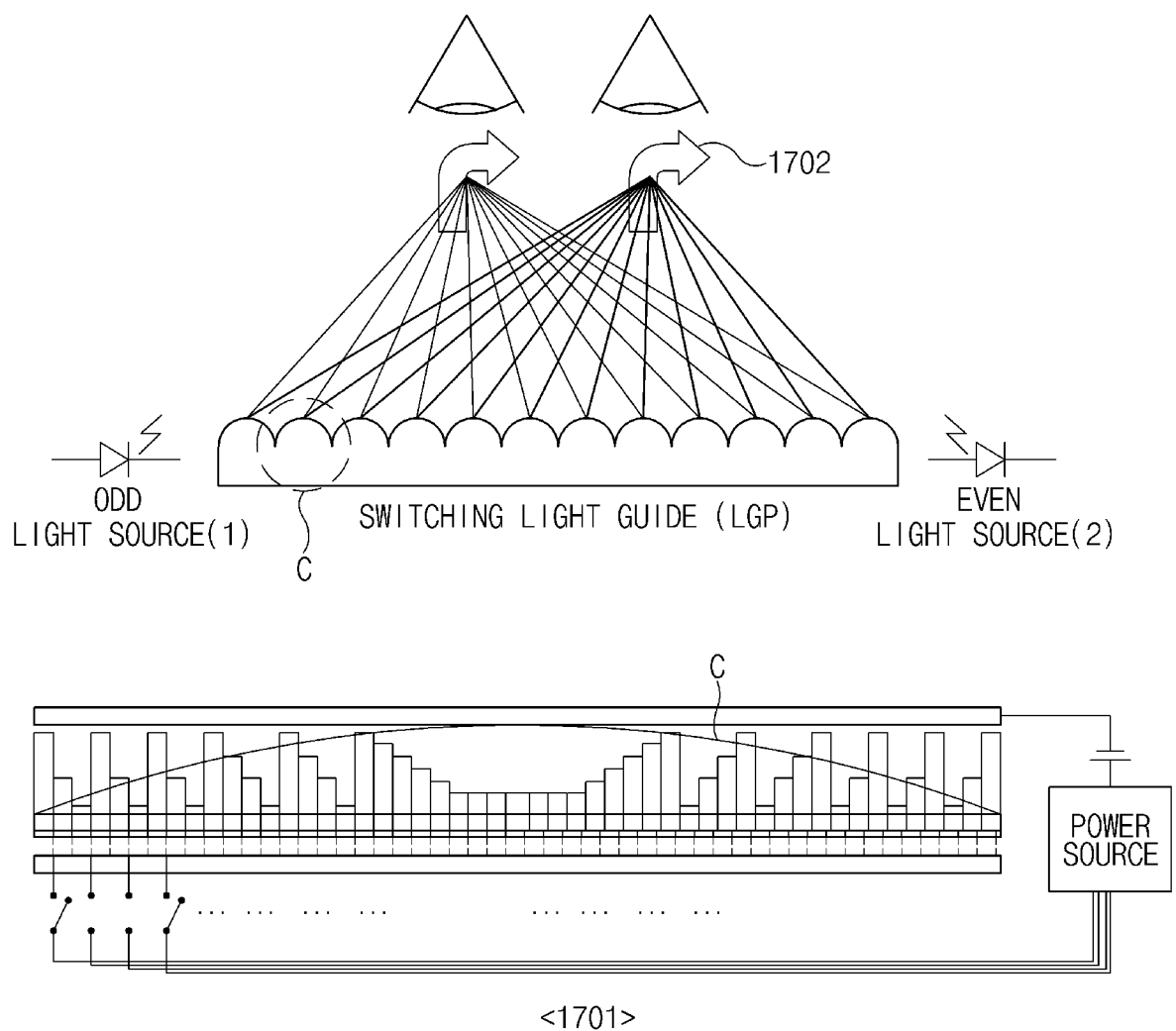
FIG. 16 is a view illustrating an exemplary operation of a switching light guide in a 3D view display mode in one form of the present disclosure.

FIG. 16 is a view illustrating an exemplary operation of a switching light guide in a 3D view display mode in some forms of the present disclosure. FIG. 17 is a timing chart illustrating a case of outputting different image data in a time-division manner in the 3D view display mode in some forms of the present disclosure. FIG. 18 is a view illustrating a 3D screen in the 3D view display mode in some forms of the present disclosure.

Referring to FIG. 16, a reflective surface C of a light guide panel 1701 is formed in a round shape. In this case, the vehicle display control apparatus 100 may exponentially vary and apply voltage to the light guide panel 1701, and therefore the reflective surface C may be formed in a round shape of an exponential form.

A first light source ODD is output to one side of the reflective surface C, and a second light source EVEN is output to an opposite side of the reflective surface C. Image data 1702 that is the same object as image data 1703, but different from the image data 1703 in terms of position is output through the first light source ODD, and the image data 1703 that is the same object as the image data 1702, but different from the image data 1702 in terms of position is output through the second light source EVEN. Accordingly, as illustrated in FIG. 18, a driver or a passenger may view a stereoscopic screen 1901.

Figure 19:
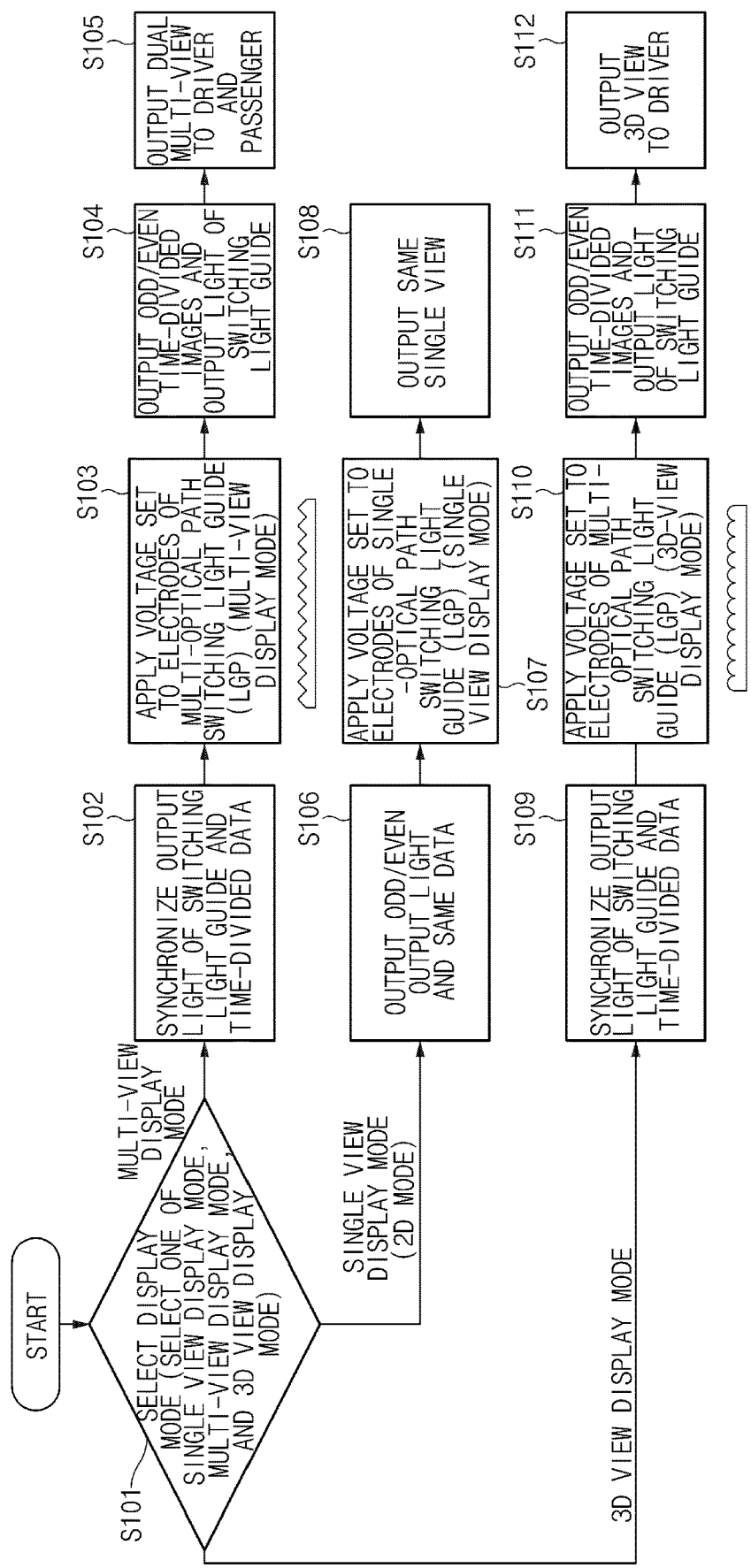
FIG. 19 is a flowchart illustrating a vehicle display control method in one form of the present disclosure.

Hereinafter, a vehicle display control method in some forms of the present disclosure will be described in detail with reference to FIG. 19. FIG. 19 is a flowchart illustrating a vehicle display control method in some forms of the present disclosure. Hereinafter, it is assumed that the apparatus 100 of FIG. 1 performs the process illustrated in FIG. 19. Furthermore, it may be understood that operations set forth as being performed by the apparatus in the description of FIG. 19 are controlled by the processor 130 of the apparatus 100.

Referring to FIG. 19, the vehicle display control apparatus 100 may receive an input of one of a single view display mode, a multi-view display mode, and a 3D view display mode through a selection by a user (Step S101). At this time, the vehicle display control apparatus 100 may select a display mode, based on the user's seat position, contents selected by the user, and a user setting value set by the user in advance.

When the multi-view display mode is selected in Step S101, the vehicle display control apparatus 100 synchronizes output light of a switching light guide and time-divided data (Step S102). As illustrated in FIG. 14, the vehicle display control apparatus 100 may synchronize the output light of the switching light guide and the time-divided data according to a reference clock.

To operate in the multi-view display mode, the vehicle display control apparatus 100 applies a preset voltage set to electrodes of a multi-optical path switching light guide to apply voltage (Step S103). Accordingly, a reflective surface of the multi-optical path switching light guide is formed in a sharp triangular shape, and ODD output light and EVEN output light are output in different directions.

The vehicle display control apparatus 100 performs time-division on image data to be provided to a driver and a passenger and outputs the image data together with the output light of the switching light guide (Step S104). That is, the image data to be provided to the passenger and the image data to be provided to the driver may be dually output in the direction in which the ODD output light is output and in the direction in which the EVEN output light is output.

The vehicle display device 200 outputs a dual multi-view to the driver and the passenger (Step S105). As illustrated in FIG. 2, two different contents are displayed on the single vehicle display device 200.

When the single view display mode is selected in Step S101, the vehicle display control apparatus 100 performs time-division on the same data and outputs the same image data together with the ODD/EVEN output light (Step S106). At this time, electrodes of a single-optical path switching light guide may be set to a voltage level for operation in a predetermined single view display mode (Step S107). As illustrated in FIG. 8, the vehicle display control apparatus 100 may synchronize the output light of the switching light guide and the time-divided data according to the reference clock.

The vehicle display device 200 outputs the same single view to the driver and the passenger (Step S108). As illustrated in FIG. 9, the single vehicle display device 200 displays the same one content.

When the 3D view display mode is selected in Step S101, the vehicle display control apparatus 100 synchronizes the output light of the switching light guide and the time-divided data (Step S109). As illustrated in FIG. 17, the vehicle display control apparatus 100 may synchronize the output light of the switching light guide and the time-divided data according to the reference clock.

To operate in the 3D view display mode, the vehicle display control apparatus 100 applies the preset voltage set to the electrodes of the multi-optical path switching light guide to apply voltage (Step S110). As illustrated in FIG. 16, the reflective surface of the multi-optical path switching light guide may be formed in a semicircular shape of an exponential form. In this case, the display mode may be a 2D view display mode or a 3D view display mode while being a multi-view display mode or a single view display mode.

The vehicle display control apparatus 100 performs time-division on the image data to be provided to the driver or the passenger and outputs the image data together with the output light of the switching light guide (Step S111). That is, as illustrated in FIG. 17, the vehicle display control apparatus 100 performs time-division on image data in which the position of the same object is different, and outputs the image data. Accordingly, the driver or the passenger may view a 3D view screen.

The vehicle display device 200 outputs a 3D view to the driver and the passenger (Step S112). As illustrated in FIG. 18, a 3D screen is displayed.

As described above, the present disclosure implements a multi-view display mode by performing time-division on image data without a separate device (a barrier or a lenticular lens), thereby achieving a high degree of freedom in design and low power consumption. Furthermore, the present disclosure outputs data by projecting light using a multi-optical path switching light guide, thereby freely switching between a single view display mode, a multi-view display mode, a 2D view display, and a 3D view display mode, compared with a conventional technology for projecting data by modifying an output path of a light source.

Accordingly, the present disclosure may simultaneously support a multi-view and a 3D view for a plurality of users with a single display device, thereby achieving space saving, a high degree of freedom in design, and low power consumption.

Therefore, the multi-optical path switching light guide and the time-division data output technology of the present disclosure may be applied to various fields such as autonomous vehicles, medical treatments, holography, next-generation displays (e.g., an auto stereoscopic display), and the like.

Figure 20:
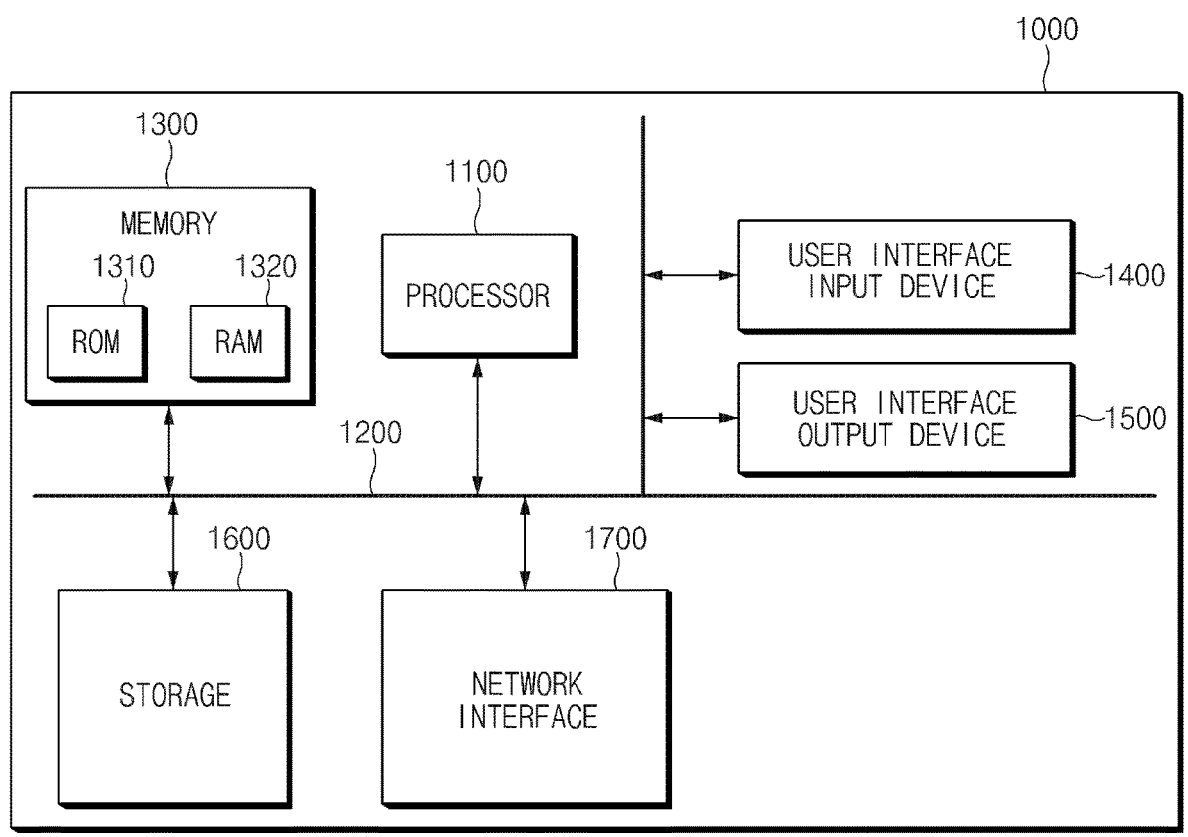
FIG. 20 is a view illustrating a computing system in one form of the present disclosure.

FIG. 20 is a view illustrating a computing system in some forms of the present disclosure.

Referring to FIG. 20, the computing system 1000 may include at least one processor 1100, a memory 1300, a user interface input device 1300, a user interface output device 1500, storage 1600, and a network interface 1700 that are connected together through a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage mediums. For example, the memory 1300 may include a read only memory (ROM) 1310 and a random access memory (RAM) 1320.

Accordingly, the steps of the methods or algorithms described in relation to some forms of the present disclosure disclosed herein may be directly implemented with a hardware module or a software module executed by the processor 1100, or a combination thereof. The software module may reside in a storage medium (that is, the memory 1300 and/or the storage 1600) such as a RAM memory, a flash memory, a ROM memory, an EPROM memory, an EEPROM memory, a register, a hard disk, a detachable disk, or a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside in a user terminal. In another case, the processor 1100 and the storage medium may reside in the user terminal as separate components.

The present disclosure provides the single vehicle display device capable of switching between a single view, a multi-view, a two-dimensional view, and a three-dimensional view, thereby achieving a reduction in cost and area.

In addition, the present disclosure provides a single view, a multi-view, a two-dimensional view, and a three-dimensional view according to necessity by projecting data synchronized with a light source in a time-division manner, thereby increasing user convenience and reliability for a vehicle system.

In addition, the present disclosure may provide various effects that are directly or indirectly recognized.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle display system comprising:
    a single vehicle display; and
    a vehicle display controller configured to:
        control an application of voltage for driving the single vehicle display;
        control the single vehicle display to switch to at least one of a first mode for displaying a single view, a second mode for displaying a multi-view, a third mode for displaying a three-dimensional view, or a fourth mode for displaying a two-dimensional view;
        in the first mode, apply a voltage of a same level that is set to cause a first light source and a second light source to be output in a same direction;
        in the second mode, linearly vary and apply a voltage that is set to cause the first light source and the second light source to be output in different directions; and
        in the third mode, exponentially vary and apply a voltage that is set to cause the first light source and the second light source to be output.

2. The vehicle display system of claim 1, wherein the single vehicle display comprises:
    a light guide panel having a reflective surface through which output light is output, wherein a shape of the reflective surface is varied corresponding to a level of the applied voltage such that an optical path is varied; and
    electric power applied to a transparent electrode of the light guide panel.

3. The vehicle display system of claim 2, wherein the vehicle display controller is configured to:
    store drive voltage levels for the first mode, the second mode, the third mode, and the fourth mode in advance by experimental values.

4. The vehicle display system of claim 2, wherein the light guide panel comprises:
    a lower substrate;
    a first insulation layer stacked on the lower substrate;
    first electrodes patterned by spacing at predetermined intervals on the first insulation layer;
    a second insulation layer configured to insulate the first electrodes;
    second electrodes patterned by spacing at predetermined intervals on the second insulation layer;
    a polymer layer formed on the second electrodes, wherein the polymer layer is capable of a phase shift; and
    an upper substrate stacked on the polymer layer.

5. The vehicle display system of claim 4, wherein when voltages are applied to the first electrodes and the second electrodes, phase alignments of polymers in the polymer layer are varied and the shape of the reflective surface is varied by the phase alignments of the polymers.

6. The vehicle display system of claim 1, wherein in the first mode, the vehicle display controller is configured to:
    perform time-division on same image data; and
    output the same image data with the first light source and the second light source.

7. The vehicle display system of claim 1, wherein in the second mode or the third mode, the vehicle display controller is configured to:
    perform time-division on different image data; and
    output first image data when the first light source is output and second image data when the second light source is output.

8. The vehicle display system of claim 7, wherein in the second mode, the vehicle display controller is configured to:
    output the first image data to a first user and the second image data to a second user through the single vehicle display.

9. The vehicle display system of claim 7, wherein in the third mode, the vehicle display controller is configured to:
    output the first image data and the second image data as three-dimensional image data to the first user through the single vehicle display.

10. The vehicle display system of claim 1, wherein the vehicle display controller is configured to:
    synchronize a clock for an output light of a switching light guide of the vehicle display device with a clock of image data when one of the first mode, the second mode, the third mode, or the fourth mode is selected.

11. The vehicle display system of claim 1, wherein the vehicle display controller is configured to:
    perform time-division on a data frame through a time-division multiplexing data frame (TDMD); and
    output multi-image data to the single vehicle display.

12. The vehicle display system of claim 1, wherein the single vehicle display includes a multi-optical path switching light guide (MO-SLG).

13. The vehicle display system of claim 1, further comprising:
    a light guide panel having a reflective surface through which output light is output, wherein a shape of the reflective surface is varied corresponding to a level of applied voltage such that an optical path is varied; and
    electric power applied to a transparent electrode of the light guide panel.

14. The vehicle display device of claim 13, wherein the light guide panel comprises:
    a lower substrate;
    a first insulation layer stacked on the lower substrate;

first electrodes patterned by spacing at predetermined intervals on the first insulation layer;
a second insulation layer configured to insulate the first electrodes;
second electrodes patterned by spacing at predetermined intervals on the second insulation layer;
a polymer layer formed on the second electrodes, wherein the polymer layer is capable of a phase shift; and
an upper substrate stacked on the polymer layer.

15. The vehicle display device of claim 14, wherein when voltages are applied to the first electrodes and the second electrodes, phase alignments of polymers in the polymer layer are varied and the shape of the reflective surface is varied by the phase alignments of the polymers.

16. A vehicle display control apparatus comprising:
a processor configured to:
   control an application of voltage for driving a single vehicle display;
   control the single vehicle display to switch to at least one of a first mode for displaying a single view, a second mode for displaying a multi-view, a third mode for displaying a three-dimensional view, or a fourth mode for displaying a two-dimensional view;
   in the first mode, apply a voltage of a same level that is set to cause a first light source and a second light source to be output in a same direction;
   in the second mode, linearly vary and apply a voltage that is set to cause the first light source and the second light source to be output in different directions; and
   in the third mode, exponentially vary and apply a voltage that is set to cause the first light source and the second light source to be output; and
memory configured to store a voltage set for driving the single vehicle display.

17. The vehicle display control apparatus of claim 16, wherein the processor is configured to:
   in the first mode, perform time-division on same image data and output the same image data together with the first light source and the second light source; and
   in the second or third mode, perform time-division on different image data and output first image data when the first light source is output and second image data when the second light source is output.

18. The vehicle display control apparatus of claim 17, wherein the processor is configured to:
   in the second mode, output the first image data to a first user and the second image data to a second user through the single vehicle display; and
   in the third mode, output the first image data and the second image data as three-dimensional image data to the first user through the single vehicle display.

* * * * *